(No Model.)

A. T. McCOY.
PRINTING TELEGRAPH.

No. 429,577. Patented June 3, 1890.

Attest:
Chauncey B. McGee,
Edw. Dummer.

Inventor:
Andrew T. McCoy

UNITED STATES PATENT OFFICE.

ANDREW T. McCOY, OF BOSTON, MASSACHUSETTS, ASSIGNOR TO JOHN ANDERSON, OF NEW YORK, N. Y.

PRINTING-TELEGRAPH.

SPECIFICATION forming part of Letters Patent No. 429,577, dated June 3, 1890.

Application filed October 17, 1887. Serial No. 252,640. (No model.)

*To all whom it may concern:*

Be it known that I, ANDREW T. MCCOY, a subject of the Queen of Great Britain, residing at Boston, in the county of Suffolk and State of Massachusetts, have invented a new and useful Improvement in Printing-Telegraphs, of which the following is a specification, reference being had to the accompanying drawings.

My invention relates to the printing machine or "ticker" for a printing-telegraph; and it consists in a type-wheel revoluble in either direction, combined with certain devices for effecting the required movements of the type-wheel, substantially as hereinafter set forth, and specifically pointed out in the claims.

Figure 1:
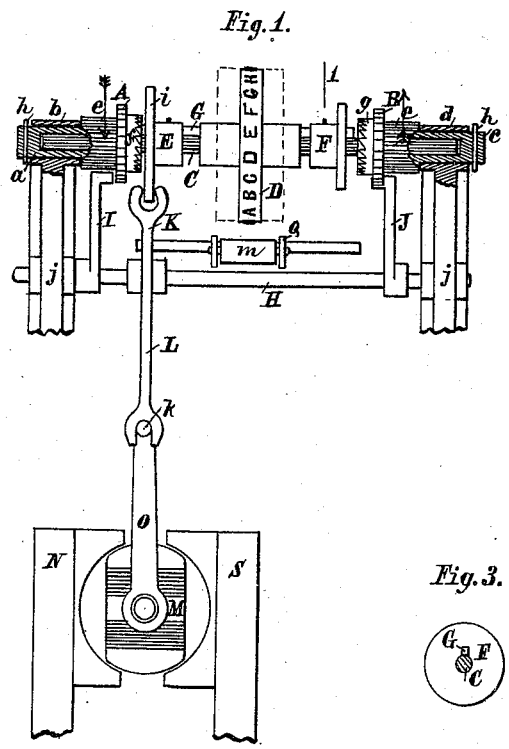
Figure 2:
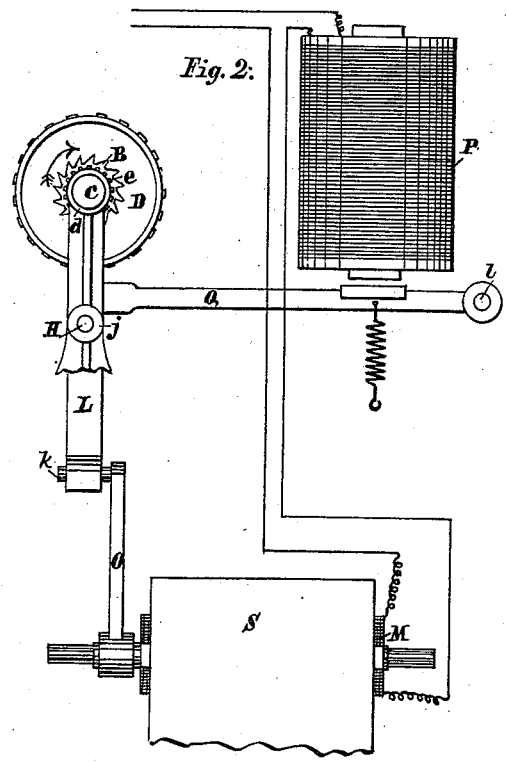
Figure 3:
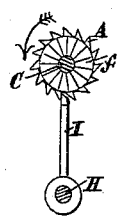
Figure 5:
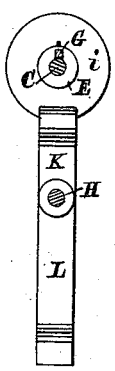
Figure 6:
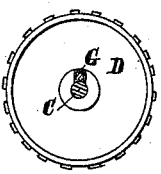
Figure 7:

In the drawings, Figure 1 is a front view of so much of a printing machine or ticker embodying my improvement as is sufficient for illustration of my invention, certain parts being shown in section. Fig. 2 is a side view of the same, the press-magnet omitted in Fig. 1 being shown in this figure. Figs. 3, 4, 5, and 6 show side views of details. Fig. 7 is a section of the pulley F, taken in the direction of line 1 in Fig. 1.

On a shaft $a$, which may revolve in a bearing $b$, is fixed a wheel A, and on a similar shaft $c$ in a bearing $d$ is fixed a wheel B. These wheels are to be revolved in opposite directions. The revolution of each may be effected by means of a pinion $e$, fixed to each and by suitable clock-work, including an escapement controlled by electric impulses, or by any other known mechanism for obtaining the unison movement required in telegraphic-printing machines. Each of the wheels A and B has notches in its edge face. Fixed to the wheel A is a wheel or hub $f$, and to the wheel B a similar wheel or hub $g$. Each of these wheels or hubs has notches in its side face. If the notches are such that ratchet-teeth are formed on the specified edge and side faces, then the teeth should be suitable for the direction of motion of the wheels, as shown. Each of the shafts $a$ and $c$ is prevented from moving endwise, there being a pin $h$ through each outside of the bearing therefor.

A shaft C has a bearing at each end in one of the shafts $a$ and $c$, which are centrally hollowed out therefor. The shaft C is prevented from moving endwise by a stop in each of the shafts $a$ and $c$. On the shaft C is fixed the type-wheel D. Two or more type-wheels, as indicated by dotted lines, Fig. 1, of like diameter may be employed, if required. Loose on the shaft C are two pulleys E and F, the former having a flange $i$. Fixed in each of these pulleys is a rod or spline G, which is parallel with the shaft and extends through the type-wheel. The pulleys may slide on the shaft, moving the rod or spline endwise in the type-wheel. Each end of the rod or spline G is formed to enter any one of the notches in one of the wheels or hubs $f$ and $g$.

Fixed on a rod H, which may slide endwise in bearings $j$, are two arms I and J. Each of these arms is so located with reference to one of the wheels A and B and is so formed at the upper or outer end that when the rod H is moved in one direction the end of arm I will enter a notch in the wheel A, and the end of the other arm J will pass out of a notch in the wheel B, and when the rod H is moved in the opposite direction engagement of the arm J with the wheel B will occur and disengagement of the arm I from the wheel A. On the rod H is also fixed an arm K, forked at the upper end so as to be brought to bear on either side face of the flange $i$, and another arm L, forked at the lower end.

Located in suitable position is a permanent magnet, the two poles N and S of which are shown. Between the poles of this magnet is an armature M, provided with a coil and supported by suitable bearings, so that it may oscillate. An arm O is fixed to the armature M or its shaft and bears at the upper or outer end a pin or stud $k$, which enters the fork of the arm L. Wires connect with the ends of the armature-coil and extend to line. The coils of the press-magnet P may also be in the same circuit, as illustrated.

The armature of the press-magnet is fixed in the usual manner to a lever Q, pivoted at $l$ and bearing at the other end the platen or press-roller $m$, it being understood that the wheels are under stress of some suitable motor, so that that they will rotate in opposite directions, except when held by one of the arms I or J. A current of electricity passing through the coil of the armature M will cause the armature to swing in one or the opposite direction, according to the nature or direction of said current, and hence cause by the sliding of the rod H one of the arms I and J to engage with one of the wheels A and B, and the other of these arms to disengage from the other of said wheels. At the same time by this means one of the wheels A B is allowed to rotate and the other is held in position by means of the arm K and flange i. The rod or spline G will engage with the one of the wheels or hubs f and g which is rotating and be disengaged from the other of said wheels or hubs. Thus the type-wheel will be revolved in either desired direction by the devices above specified, and that direction will be determined by the polarity of the armature M—that is, by the nature of the electricity which may be controlled at the transmitting end of the line, as will be readily understood.

The arms I J may act as escapement-levers to allow the type-wheel to be rotated by the motor one letter-space at a time in either direction in accordance with the position of the escapement. By sending a succession of impulses of the same polarity, for instance, the escapement will operate to allow the type-wheel to be propelled a number of steps in one direction equal to the number of impulses, and then by reversing the direction of the impulses the type-wheel will be propelled in the other direction; or the motors may be so arranged as to propel the type-wheel step by step in the desired direction as long as the arms I or J permit the rotation of their respective wheels A and B.

The mechanism described may be variously modified without departing from the spirit of my invention. Heretofore the type-wheel in electric printing machines or tickers has been revolved in one direction only; hence I do not wish to confine my invention to the particular devices described for revolving the type-wheel in either direction, but would claim a printing-machine embodying a type-wheel whose direction of motion may be changed by a change in the nature of the electric current or impulses at the option of the person transmitting, substantially as set forth.

By means of my invention messages may be much more rapidly transmitted than heretofore. After one letter or character has been printed the type-wheel may be caused to revolve in the direction to make the less movement of the wheel to bring it into position for printing the next required letter or character. Oftentimes, when the type-wheel moves in one direction only, nearly a complete revolution is necessary to reach the type for the next letter or character, while very frequently the longer distance is taken. This results in a loss of time, which is avoided by my method.

I claim as my invention—

1. In an electric printing-machine, the combination of a type-wheel, two wheels revolved independently of each other in opposite directions and about the same axis as that of the type-wheel, a magnet, an armature therefor, and a clutch device operated by said armature for causing an engagement of the type-wheel with either of said two wheels and disengagement of the type-wheel from the other of said two wheels, the coils of said armature being in the same circuit with the coils of the press-magnet, substantially as set forth.

2. In an electric printing-machine, the combination of a type-wheel, two wheels revolved independently of each other in opposite directions and about the same axis as that of the type-wheel, a magnet, an armature therefor, and a clutch device operated by said armature for releasing either of said two wheels and causing an engagement of the same with the type-wheel and for causing a disengagement of the other of said two wheels from the type-wheel and a stoppage of the same, the coils of said armature being in the same circuit with the coils of the press-magnet, substantially as set forth.

3. The combination of a type-wheel, two notched wheels f and g, revolved in opposite directions, two pulleys E and F, one provided with a flange i, a rod or spline G to engage with said wheels, and an arm K, substantially as and for the purposes set forth.

4. A magnet, armature, and coil, combined substantially as specified, whereby a change of polarity of the current or impulse will cause the armature to oscillate, in combination with a type-wheel revoluble in either direction, two notched wheels f and g, revolved in opposite directions, arms K L, and spline G, substantially as specified.

5. A magnet, armature, and coil, combined substantially as specified, whereby a change of polarity of the current or impulse will cause the armature to oscillate, in combination with a type-wheel revoluble in either direction, two notched wheels A and B, two notched wheels or hubs f and g, arms I and J, arms K and L, and spline G, substantially as and for the purposes set forth.

ANDREW T. McCOY.

Witnesses:
EDW. DUMMER,
CHAUNCEY B. McGEE.